3,573,933
CHEWING GUM BASE
David M. MacLeod, Sarnia, Ontario, Canada, assignor to Esso Research and Engineering Company
No Drawing. Filed Nov. 14, 1968, Ser. No. 775,925
Int. Cl. A23g 3/00
U.S. Cl. 99—135                 5 Claims

ABSTRACT OF THE DISCLOSURE

A chewing gum base is compounded and composed of a low melting point paraffin wax and a higher melting point microcrystalline wax together with small but effective amounts of poly alpha-olefins, for example, polyisobutylene, and of elastomeric olefinic copolymers, such as butyl rubber or ethylene/propylene rubber.

DESCRIPTION OF THE INVENTION

Plastic compositions specifically designed for use as chewing gum bases are generally old in the art and have been from time to time compounded from natural gums, synthetic gums, and polymeric plastic or elastomeric materials. As described in Industrial and Engineering Chemistry, vol. 51, No. 6, June 1959, chewing gum typically consists of 60% pulverized sugar, about 20% of corn syrup, and about 20% chewing gum base, with minor amounts of flavoring, i.e., less than 1%, also being incorporated. The base composition averages about 40% natural gums such as Mexican chicle, sorva, jelutong, etc., about 10% calcium carbonate filler, about 45% synthetic or natural rubber such as butyl rubber, polybutadiene, etc., mixed with other polymeric resins such as polyvinyl acetate and waxes, and about 5% of glycerides which are present to control moisture.

In the past, it has been suggested that in order to reduce costs, paraffin wax might be employed as a major component of the chewing gum base. Also synthetic ester gums such as the coumarone resin types and the polyvinyl ester gums are also employed in whole or in part as substitutes for the natural gum such as chicle. U.S. Patent 2,413,239 discloses the use of minor amounts of butyl rubber in a chewing gum base which also may contain a filler such as stearic acid, precipitated chalk, or charcoal. Also, a paraffin wax of about 150° F. melting point or a paraffin wax of between about 120° and about 130° F. melting point is incorporated into the chewing gum base. U.S. Patent 2,137,746 teaches the compounding of a chewing gum base in which a paraffin wax of from 160°–180° F. melting point is used. U.S. Patent 2,284,804 incorporates polyisobutylene (Vistanex) of varying molecular weights into a chewing gum base which also contains paraffin wax and a resin.

One of the problems in preparing or compounding a chewing gum base which is devoid of any natural gum such as chicle, has been the item of cost, i.e., most of the synthetic materials which have suitable properties when mixed in proper amounts are too costly to compete economically with Mexican chicle, for example. An additional problem is encountered when employing a synthetic elastomeric product such as butyl rubber, polybutadiene rubber or ethylene/propylene rubber, for the reason that the incorporation of the synthetic rubber is not easily accomplished because of problems of solubility and compatibility with the other components of the chewing gum base. Thus, for example, the incorporation of a small amount of butyl rubber into a soft paraffin wax results in incomplete solution of the butyl rubber in the wax. This results in a grainy non-cohesive composition which is not only unpleasant when chewed because of the feel of the heterogeneous composition to the mouth and tongue but also because it is difficult to incorporate any long lasting flavor effects to such composition.

It has now been discovered, however, that an excellent chewing gum base can be made at a considerably lower cost than the commercial chewing gum bases presently used and with a suitable viscosity and good solubility with each of the ingredients with one another. This is accomplished by the thorough admixing of a soft paraffin wax, a medium microcrystalline wax, an elastomeric material such as butyl rubber, or ethylene/propylene rubber, and finally a poly alpha-olefinic material of relatively low molecular weight such as polyisobutylene. It was also surprising to discover that in order to get good compatibility of the rubbery component into the chewing gum base, the presence of the poly monoolefin, i.e., polyisobutylene, was necessary. The resultant composition is considerably lower in cost than the commercial chewing gum base made from natural gums. The formulation possessed good cohesion, was relatively soft and easily chewed, did not stick to the mouth or teeth, and it possessed no taste or odor of its own.

As before stated, a mixture of both the poly olefin and the synthetic elastomeric rubber is necessary, for tests have shown that the incorporation of either of these two types of substances alone is unsatisfactory. The solubility of these two substances in the paraffin wax or mixture of paraffin wax and microcrystalline wax is dependent upon the presence of both types of polymeric materials. It was also discovered that in order to get good cohesion, more than 3 wt. percent of each of these polymeric components was necessary in the chewing gum base. The use of the microcrystalline wax component was found to be essential in order to achieve satisfactory compatibility between the paraffin wax and the elastomeric component. This wax had to be a relatively soft, high molecular weight microcrystalline wax with a high non-normal paraffin content for flexibility. If this flexible property was not present in the microcrystalline wax, but the wax contained more normal paraffinic components, the mixture did not achieve a homogeneous condition. It was necessary that the microcrystalline wax have a relatively high penetration value so that the final chewing gum base would be suitably soft when chewed. It was unexpected that the mixture of wax with the polymeric components used in relatively small amounts gave chewing characteristics because the butyl rubber, for example, was made compatible with the wax by the mutual solvent action of the polyisobutylene. Although the microcrystalline wax, for example, might be one having an ASTM melting point of about 150° F., it was also found that this same wax should be relatively soft at room temperature. If much more than about 7 wt. percent of butyl rubber was incorporated into the chewing gum base, it became relatively incompatible and insoluble in the wax and if much more than about 7 wt. percent of polyisobutylene, for example, was incorporated into this chewing gum base, the base became too sticky.

The basic components of the chewing gum base are as follows:

(A) A soft low melting point paraffin wax having an ASTM melting point of between about 115° and about 130° F., preferably between about 120° and about 125° F. is employed. Such waxes are standard articles of commerce and are readily available on the open market. They have an oil content of below about 0.5%, a needle penetration between about 20 and about 40 mm./10, measured at 77° F., and a viscosity of between about 35 and about 40 SUS at 210° F. They are generally manufactured from light waxy petroleum distillates boiling at from 700° to 900° F. and are recovered by solvent recrystallization carried out at a temperature of from about 0° to about +20° F. At such temperatures, essentially all of the wax precipitates from the solution, including the very desirable soft low melting fractions, which impart the desired properties to the wax when used as a chewing gum base.

(B) A microcrystalline wax component having an ASTM melting point of between about 130° and about 170° F., preferably between about 140° and about 160° F., an oil content below about 2.0%, a needle penetration of between about 20 and about 40 mm./10, measured at 77° F., and a viscosity of from about 60 to about 100 SUS at 210° F. Such microcrystalline waxes are available commercially on the open market and they are flexible and adhesive as distinguished from being brittle. Their recovery is by solvent recrystallization carried out at a low enough temperature to precipitate the low melting non-normal paraffin fractions so as to impart the necessary flexibility and synthetic rubber compatibility to enable them to be used in compounded chewing gum bases. Usually this recrystallization temperature ranges between about 40 and about 70° F.

(C) An elastomer such as butyl rubber, polybutadiene rubber, polyisoprene rubber, natural rubber and ethylene/propylene rubber having molecular weights which should be between about 150,000 and about 600,000 viscosity average molecular weight as measured by the Flory method is employed. Preferably on the same basis, the molecular weight will be between about 350,000 and about 450,000. Butyl rubber, which is preferred, is a conventional commercially marketed material made from isobutylene and isoprene in which the isoprene content is something less than 2.0 mole percent, a preferred mole percent being 0.7 mole percent. Various grades of the butyl rubber may be employed so long as the molecular weight of that butyl rubber is within the aforementioned range. Typical marketed butyl rubbers are of 150,000; 400,000; and 450,000 molecular weights. Likewise, ethylene/propylene rubbers are useful where they have viscosity average molecular weights, as mentioned, by the Flory method of between about 200,000 and about 600,000. A specific butyl rubber employed in the following examples has a viscosity average molecular weight of about 400,000 as measured by the Flory method. Food grade antioxidants such as butylated hydroxy toluene may be added in amounts of 1% or less to any of these rubbers.

(D) A poly olefinic component such as polyisobutylene, polypropylene or the copolymer of isobutylene with propylene or with ethylene is employed. These polyolefins or the copolymers of these monoolefins are useful so long as they have a viscosity average molecular weight ranging between about 30,000 and about 60,000, preferably between about 40,000 and about 50,000, as measured by the Flory method. A particular preferred polyisobutylene employed herein has a viscosity average molecular weight of between about 40,000 and about 50,000 as measured by the Flory method.

The paraffin wax melting points are measured by the ASTM Method D–87–66, the oil content by ASTM Method D–721,65T, the needle penetration by ASTM Method D–1321–65, and the viscosity by ASTM Methods D–445–65 and D–2161–66. In the case of the microcrystalline wax, the melting point was determined by ASTM Method D–127–63, the viscosity average molecular weights of the polyolefins and of the synthetic rubbers were determined either by the Staudinger method or by the Flory method as indicated in each instance.

The relative amounts of the four components may vary over a moderately wide range depending upon the physical properties of the specific materials employed. The relative amounts of the four components as finally selected are such that the final blended chewing gum base possesses good cohesion, is non-sticky, has a smooth feel, i.e., is not grainy, and the components are completely compatible with each other after admixture. The final composition must, of course, also have good chewing characteristics and have pleasing oral sensations when chewed. The relative specific amounts are as follows: soft paraffin wax A, 30 to 65 wt. percent; microcrystalline wax, 30 to 60 wt. percent; elastomer, 3.5 to 7 wt. percent; and polyolefin, 3.5 to 7 wt. percent. The preferred limits are from 40 to 60% of paraffin wax, 35 to 55% of microcrystalline wax and 4 to 6% each of elastomer and polyolefin. In the following specific examples, the butyl rubber employed had a viscosity average molecular weight of 50,000 (Staudinger) and the polyisobutylene had a viscosity average molecular weight of 9,000 (Staudinger).

Various chewing gum bases were prepared by compounding them in the following manner:

Dispersion of high molecular weight rubber in wax was accomplished by first diluting the rubber as the matrix with small additions of wax. The rubber-wax concentrate was made by preblending the butyl rubber with some of the paraffin wax in the ratio of 1 part rubber to 2 parts paraffin wax in a Banbury mixer. In this high-shear equipment the rubber is masticated at about 250° F., and the wax added in increments. The concentrate containing ⅓ rubber and ⅔ wax is then suitable for dissolving in liquid wax with normal agitation.

The microcrystalline wax and the remainder of the paraffin wax were combined, melted, and heated to about 170° F. A regular laboratory paddle stirrer turning at about 500 r.p.m. was used to provide mixing. The butyl rubber-wax concentrate was added, and was completely dispersed after about 30 minutes of mixing time. The polyisobutylene was then added, and dispersion achieved after a further 30 minutes under the same mixing conditions.

The chewing characteristics were tested using the gum base as such, without addition of flavor, sweetening, or calcium carbonate filler. Both flavor and sweetening are quickly dissolved and extracted in the mouth, so that their presence is not necessary for testing chewing properties. Calcium carbonate or other inert filler is used in conventional chewing gums to adjust the softness and tackiness to the required level, and is not required with the proposed gum base.

The various compositions shown in the following table were rated by 10 persons chewing each mixture for about 10 minutes, and assessing the chewing quality on the basis of their personal preference.

TABLE I.—COMPOSITIONS OF CHEWING GUM BASE

| | Wt. percent composition | | | | |
|---|---|---|---|---|---|
| Example | Soft paraffin wax (A-1) | Microcrystalline wax (B-1) | Butyl rubber (C) | Polyisobutylene (D) | Rating of chewed composition (10 minutes) |
| 1 | 45 | 45 | 5 | 5 | Excellent. |
| 2 | 43 | 44 | 8 | 5 | Too hard. |
| 3 | 42 | 43 | 5 | 10 | Too sticky. |
| 4 | 47 | 47 | 3 | 3 | Slightly waxy feel; lacks cohesion. |
| 5 | 48 | 47 | 5 | 0 | Rubber incompatible. |
| 6 | 48 | 47 | 0 | 5 | Too soft; slightly sticky; lacks cohesion. |
| 7 | ¹ 45 | 45 | 5 | 5 | Too hard. |
| 8 | ² 90 | 0 | 5 | 5 | Rubber incompatible. |
| 9 | ² 45 | ³ 45 | 5 | 5 | Slightly hard; rubber slightly incompatible. |
| 10 | ² 45 | ⁴ 45 | 5 | 5 | Too hard. |
| 11 | ² 100 | | | | Not cohesive; waxy feel. |
| 12 | | ⁵ 100 | | | Do. |
| 13 | ² 95 | | 5 | | Rubber incompatible. |
| 14 | ² 90 | | | 10 | Not cohesive; sticky. |
| 15 | ² 80 | | | 20 | Too sticky. |

¹ Hard paraffin wax (A–2).
² Soft wax (A–1).
³ Microcrystalline wax (B–2).
⁴ High melt microcrystalline wax (B–3).
⁵ Microcrystalline wax (B–1).

Soft wax A–1—ASTM melting point 125° F., oil content 0.2%, needle penetration @ 77° F. 22 mm./10, viscosity 38.5 SUS @ 210° F.
Hard wax A–2—ASTM melting point 125° F., oil content 0.2% needle penetration @ 77° F., 13 mm./10, viscosity 38.5 SUS @ 210° F.
Microcrystalline wax B–1—ASTM melting point @ 145° F., oil content 0.8%, needle penetration @ 77° F., 28 mm./10, viscosity 85.0 SUS @ 210° F., flexible @ 32° F.
Microcrystalline wax B–2—ASTM melting point 140° F., oil content 0.7%, needle penetration @ 77° F., 22 mm./10, viscosity 65.0 SUS @ 210° F., slightly flexible @ 32° F.
Microcrystalline wax B–3—ASTM melting point 180° F., oil content 0.7%, needle penetration @ 77° F., 9 mm./10, viscosity 62.0 SUS @ 210° F., brittle.

It will be observed from a study of the compositions and the ratings set forth in the preceding table that the most advantageous chewing gum base compounded of the four components herein discussed was that of Example 1 and that the drastic deviation between the use of the four component composition and any three of the four components was unsatisfactory. Furthermore, the use of a soft wax alone or a microcrystalline wax alone was entirely unsatisfactory for the purposes of using the same as a chewing gum base. Additionally, it will be noted from the results appearing in Table I the following. Examples 2, 3 and 4 show that the amounts of butyl rubber and polyisobutylene must be maintained close to the preferred levels of 5% of each in the chewing gum base, for satisfactory quality.

In Example 7, a hard paraffin wax of paper coating grade was substituted for the preferred soft paraffin wax. The melting point, oil content, and viscosity were the same for both paraffin waxes, which differed only in penetration values. The hard paraffin wax was found to be quite unsuitable for chewing gum base.

Example 10 shows that the microcrystalline wax must also be of a specific character. Substitution of the microcrystalline wax B–3 of 9 mm./10 penetration for the microcrystalline wax B–1 gave a base that was too hard. Even microcrystalline wax B–2 resulted in some slight rubber incompatibility and some slight hardness in the chewing gum base yet it had a 22 mm./10 penetration.

The present invention having now been fully described and illustrated, what is desired to be secured by Letters Patent is:

1. A chewing gum base comprising a compatible blend of
   (a) from about 30 to about 65 weight percent of a soft paraffin wax having an ASTM melting point of from about 115° to about 130° F., an oil content of less than 0.5 wt. percent, and a needle penetration at 77° F. between about 20 and about 40 mm./10;
   (b) from about 30 to about 60 weight percent of a microcrystalline petroleum wax having an ASTM melting point of from about 130° to about 170° F., an oil content below about 2 wt. percent, a needle penetration at 77° F. of between about 20 and about 40 mm./10, and a viscosity of from about 60 to about 100 SUS at 210° F;
   (c) from about 3.5 to about 7 percent by weight of an elastomer having a Flory method viscosity average molecular weight of from about 150,000 to about 600,000, said elastomer being selected from the group consisting of butyl rubber and ethylene/propylene rubber; and
   (d) from about 3.5 to 7 percent by weight of polyisobutylene of Flory method viscosity average molecular weight of about 30,000 to about 60,000;
all of said weight percentages being based on the total composition.

2. Chewing gum base as defined by claim 1 wherein said paraffin wax comprises about 40 to about 60 percent by weight, said microcrystalline wax comprises about 35 to about 55 percent by weight, and said elastomer and said polyisobutylene each comprise from about 4 to about 6 percent by weight, of said composition.

3. A chewing gum base as in claim 1 wherein the waxes amount to about 85 to about 90 wt. percent, the balance being equal parts by weight of polyisobutylene and butyl rubber.

4. A chewing gum base as in claim 3 wherein the waxes amount to about 90 wt. percent, the polyisobutylene, about 5 wt. percent, and the butyl rubber, about 5 wt. percent.

5. A chewing gum base as in claim 4 wherein the paraffin wax is about 45 wt. percent, the microcrystalline wax is about 45 wt. percent, the polyisobutylene is about 5 wt. percent, and the butyl rubber is about 5 wt. percent.

References Cited

UNITED STATES PATENTS

| | | | |
|---|---|---|---|
| 2,124,235 | 7/1938 | Mueller-Cunradi et al. | 99—135X |
| 2,284,804 | 6/1942 | De Angelis | 99—135 |
| 2,413,239 | 12/1946 | Manson | 99—135 |
| 2,468,393 | 4/1949 | Corkery | 99—135 |
| 3,159,491 | 12/1964 | Mahan | 99—135 |
| 3,473,933 | 10/1969 | Sato et al. | 99—135 |

JOSEPH M. GOLIAN, Primary Examiner